Oct. 14, 1924.                                             1,511,384
W. O. WEBB
AGRICULTURAL IMPLEMENT
Filed May 5, 1922
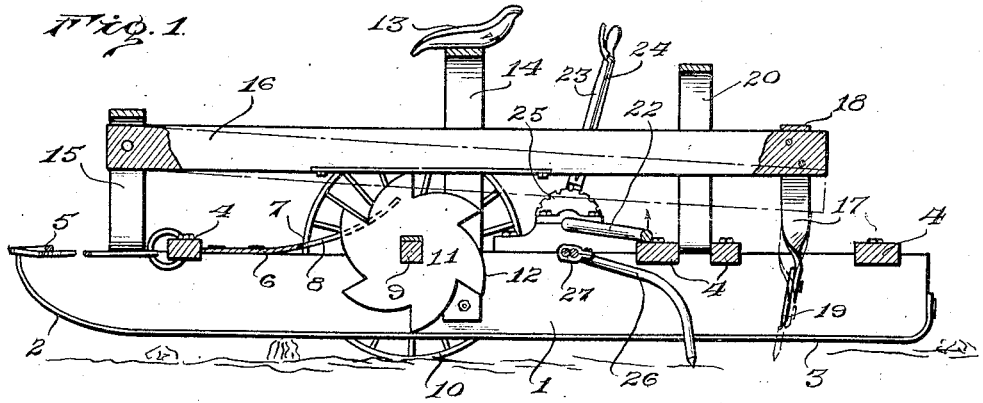
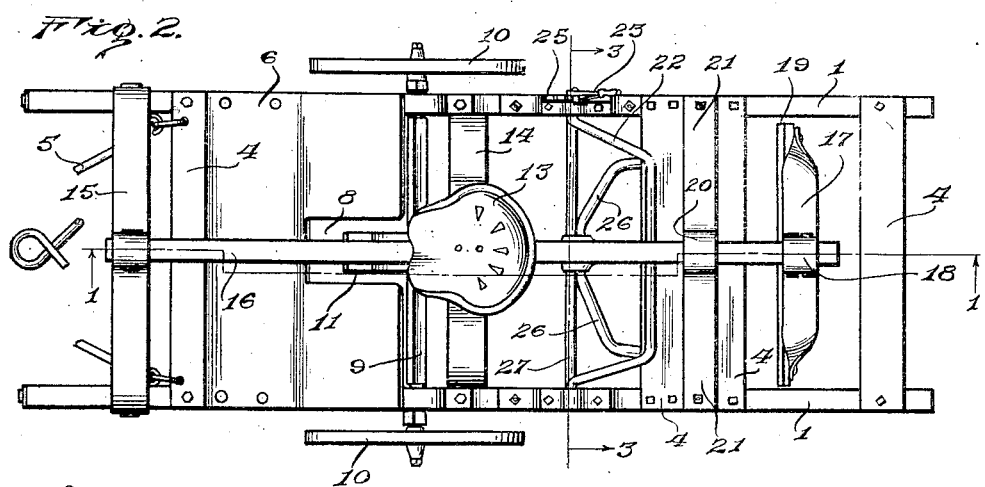
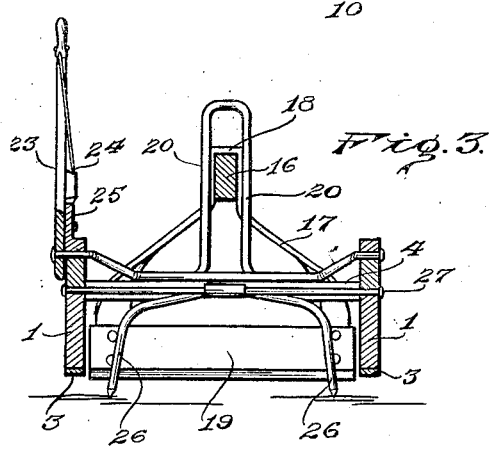
Inventor
William O. Webb
By Lacey & Lacey, Attorneys

Patented Oct. 14, 1924.

1,511,384

UNITED STATES PATENT OFFICE.

WILLIAM O. WEBB, OF IRA, TEXAS.

AGRICULTURAL IMPLEMENT.

Application filed May 5, 1922. Serial No. 558,622.

*To all whom it may concern:*

Be it known that I, WILLIAM O. WEBB, a citizen of the United States, residing at Ira, in the county of Scurry and State of Texas, have invented certain new and useful Improvements in Agricultural Implements, of which the following is a specification.

The object of this invention is to provide an inexpensive machine by the use of which stalks left after gathering a crop may be effectually cut into small pieces preparatory to placing the ground in condition for the planting of another crop. The invention seeks to provide a machine of light draft and compact form whereby, as the machine is drawn over a field, the standing stalks or vines will be arranged longitudinally of the line of travel so as to be disposed for effectual engagement by a transverse knife. The invention also seeks to provide a machine of novel construction whereby the driver will be protected from contact with the stalks and the stalks will be completely severed as the machine is drawn along the rows of stalks. The invention also contemplates the provision of means whereby the cutter may be held in an inoperative position at will. The several stated objects of the invention and other objects which will incidentally hereinafter appear are attained in the use of such a machine as is illustrated in the accompanying drawings, and the invention resides in certain novel features which will be particularly pointed out in the claim following the description.

In the drawings—

Figure 1 is a central longitudinal vertical section of an implement embodying my invention;

Fig. 2 is a plan view of the same;

Fig. 3 is a detail transverse section on the line 3—3 of Fig. 2.

In carrying out my invention, I employ a pair of sills 1 which have their front ends tapered, as shown at 2, whereby they may readily pass over the ground when in contact therewith and the lower edges of these sills are shod with metal, as shown at 3. The sills are connected at intervals by cross bars 4 which impart rigidity to the structure and maintain the sills in a parallel relation. To the front cross bar 4, I secure a bail or other draft-applying device 5 which may be coupled to a tractor or connected with a team of draft animals, and extending rearwardly from the said cross bar is a shield 6 whereby the stalks will be positively bent over toward the ground and will be prevented from striking the operator. This shield is conveniently a metallic plate secured upon the upper edges of the sills and extending between the same and curved slightly upwardly, as shown at 7, toward its rear edge. A notch 8 is provided centrally in the rear portion of the shield for a purpose which will presently appear.

An axle 9 is mounted for rotation in any desired manner upon the sills and upon the ends of this axle are secured ground wheels 10 which are adapted to run upon the surface of the ground and support the machine as well as impart rotation to the axle. Between the sills and in alinement with the notch 8, a cam 11 is secured to the axle and the said cam is provided upon its periphery with a series of cam faces 12 which actuate the cutter in a manner to be described. The operator may ride in a seat 13 carried by an arched standard 14 secured to and rising from the sills slightly in rear of the axle.

Near the front ends of the sills, an arched standard 15 is secured thereto and in the apex of this arched standard is pivotally secured the front end of the lever or cutter arm 16. The lever or arm 16 extends longitudinally of the machine over and in the vertical plane of the cam 11 and has the cross arm 17 secured to its rear end, said arm having a central inverted U-shaped portion 18 fitting closely about and secured rigidly to the extremity of the lever or arm and the extremities of this cross arm are rigidly secured to a transverse knife 19. When the lever or arm 16 is free, it will bear upon the cam 11 and as the said cam is rotated, the several cam faces thereof will oscillate the lever in a vertical plane, as will be readily understood upon reference to Fig. 1, the knife 19 being thereby alternately raised from the ground and then permitted to drop to the same so that any stalks which may be under the knife will be severed. In order that the lever or arm may be maintained positively in the vertical plane of the cam 11 so as to be properly operated by the same, I provide a guide 20 which consists of an arch or side plates disposed vertically at the center of the implement and engaging the opposite sides of the lever. These side plates or guiding members have their ends 21 carried laterally to be secured to the sills, as will be readily understood on reference to Fig. 2. The provision of these guiding members 20 effectually prevents lateral movement of the lever or knife arm so that the cutter will be maintained in its position between the sills 1 and will be always in position to cut through the stalks lying upon the ground. Mounted in suitable bearings upon the sills in advance of the guides 20 is a rocking bail or lifter 22 which is adapted to bear against the under side of the lever or arm 16 and thereby maintain the same in an elevated inoperative position when the implement is to be carried from field to field. This rocking bail or lifter is controlled by a hand lever 23 which is fixed to one end of the lifter and equipped with a latch 24 for cooperating with a rack 25 on the adjacent sill whereby the lever and the lifter will be maintained in a set position. When the implement is in use, the lifter will be disposed, as shown in Fig. 1, out of the range of movement of the lever arm so that it will not interfere in any degree with the oscillations of said arm and the resulting vertical movements of the cutter. Between the actuating cam and the cutter, I provide a fork or rake teeth 26 by which the stalks and vines will be caused to assume a position longitudinally of the implement so that they will be in the proper position to be positively engaged by the cutter. These teeth 26 are hung upon a transverse rod 27 secured in the sills and extend rearwardly and downwardly from said rod.

With the parts in the position shown in Fig. 1, draft is applied to the device and it is drawn over the field along the row of stalks which are to be cut. The cross bar 4 and the shield 6, as well as the draft-applying device 5, will, of course, come in contact with the stalks and bend them over to the ground. As the progress of the device continues, the rake teeth 26 will come into contact with the stalks and will obviously push them toward the longitudinal center of the device so that they will be disposed substantially longitudinally or parallel with the line of travel. The actuating cam 11, of course, rotates constantly with the ground wheels 10 and, therefore, continually oscillates the lever or arm 16 so that the transverse cutter 19 is operated without interruption to pass through the stalks and then withdraw therefrom. By the use of my device, the stalks are effectually cut into short pieces so that, if the ground be subsequently plowed, these pieces of stalks and vines will be turned into the earth and will eventually enrich the same as is well known. My device is exceedingly simple and compact in the arrangement of its parts and is not apt to get out of order.

Having thus described the invention, what is claimed as new is:

The combination of a portable supporting frame, an arch secured on said frame near the front end thereof, a lever pivoted at its front end within said arch and disposed longitudinally of the supporting frame, a transverse knife carried by the rear end of said lever, vertical guides on the frame near the rear end thereof engaging opposite sides of the lever to prevent lateral movement thereof, and a multiple cam mounted upon the frame below the lever and adapted to engage the under side thereof to oscillate the same.

In testimony whereof I affix my signature.

WILLIAM O. WEBB.